United States Patent [19]

Hallford et al.

[11] 3,870,960

[45] Mar. 11, 1975

[54] MIXER CARRIER NULL ADJUSTMENT

[75] Inventors: Ben R. Hallford, Wylie; Charles H. Wright, Plano, both of Tex.

[73] Assignee: Rockwell International Corporation, Dallas, Tex.

[22] Filed: Oct. 12, 1973

[21] Appl. No.: 406,061

[52] U.S. Cl. .............................. 325/446, 321/69 W

[51] Int. Cl. .............................................. H04b 1/26

[58] Field of Search ...... 325/445, 446, 449; 321/60, 321/69 R, 69 W; 332/43 R, 43 B, 47

[56] References Cited

UNITED STATES PATENTS

| | | | |
|---|---|---|---|
| 2,951,149 | 8/1960 | Greig et al. | 325/445 |
| 3,195,051 | 7/1965 | Chang | 325/445 X |
| 3,579,116 | 5/1971 | Knirsch | 325/446 |
| 3,624,508 | 11/1971 | Kach | 325/446 |
| 3,743,933 | 7/1973 | Preti | 325/446 |

*Primary Examiner*—Benedict V. Safourek
*Attorney, Agent, or Firm*—Bruce C. Lutz

[57] ABSTRACT

A technique of minimizing local oscillator signals external to a mixer circuit through the reflecting of the local oscillator frequency signals in a balanced rat-race hybrid mixer circuit to minimize the amplitude of the local oscillator signals appearing at the output. This is accomplished by juxtaposing a field distortion means adjacent the rat-race ring and adjusting its nearness to and position on the circumference of the ring to alter the amplitude and phase of the reflected signals. A further adjustment is made to the current in the mixer diodes of an upconverter type mixer in an attempt to equalize operating characteristics of the diodes.

6 Claims, 4 Drawing Figures

MIXER CARRIER NULL ADJUSTMENT

THE INVENTION

The present invention is generally concerned with electronics and more specifically concerned with microwave circuitry. Even more specifically, the present invention is concerned with apparatus for reducing the amplitude of a local oscillator signal in the output of a mixer circuit.

In operating a mixer of either the upconverter or downconverter type it is necessary to have a relatively high power local oscillator compared to the amplitudes of the input and output signals. This high powered local oscillator signal produces sidebands or mirror images of the difference frequency to this signal with which it is mixed. These sidebands or mirror image signals are then utilized from the output of the mixer circuit. However, the amplitudes of these sideband or mirror image signals are often less than design requirements of 20 db greater in magnitude than the amplitude of the signal at the local oscillator frequency which may appear at the output even when a balanced mixer circuit is used. The high level is normally caused by differences in operating characteristics of the diodes or in manufacturing tolerances or design errors in the mixer itself. While various compensations may be added to the circuit to lower the amplitude of the local oscillator signal in the output for a given frequency, it has been very difficult in the past to maintain this minimized output over a wide range of frequencies. The present invention accomplishes this reduction of the local oscillator frequency signal appearing in the output through the use of two adjustments. The first adjustment alters the relative currents in the two mixing diodes while the second adjustment products reflections of the local oscillator signals in the rat-race ring whereby the amplitude and phase of the local oscillator signals reaching the mixing diodes is varied to minimize the resultant amplitude at the output without disturbing the magnitude of the sideband signals.

It is therefore an object of the present invention to provide an improved means of mixing signals in a rat-race ring.

Other objects and advantages of the present invention may be ascertained from a reading of the specification and appended claims in conjunction with the drawings wherein:

DETAILED DESCRIPTION

Figure 1:
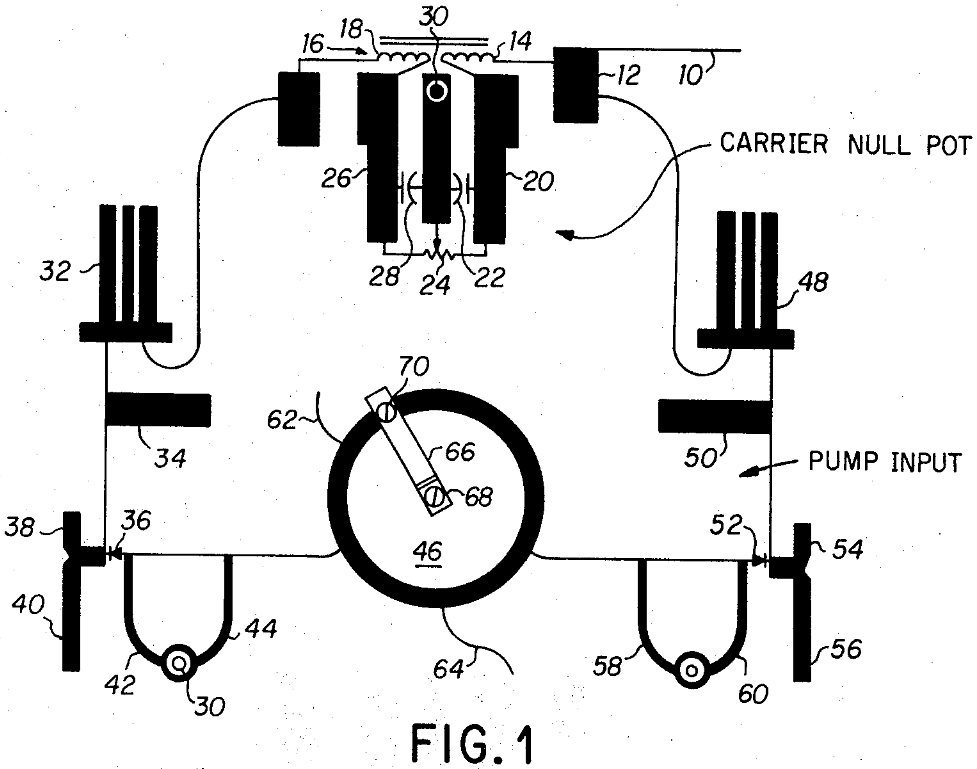
FIG. 1 is a schematic diagram of one embodiment of an upconverter practicing the present invention.

In FIG. 1 an input 10 is shown supplying a signal to a junction 12 which supplies an output to one end of a winding 14 of a transformer generally designated as 16 and having a second winding 18. The other end of winding 14 is connected to a junction 20 and junction 20 is connected to one end of a capacitor 22 and one end of a potentiometer generally designated as 24. One end of winding 18 is connected to a junction 26 which is further connected to one end of a capacitor 28 and to the other end of the potentiometer 24. A wiper of potentiometer 24 is connected to the other end of each of the capacitors 22 and 28 and is further connected to ground 30. The other end of winding 18 is connected through a radio frequency rejection filter 32 past an open stub 34 which is one-quarter the wave length of the output frequency to one end (cathode) of a first mixer diode or non-linear mixing means 36. This end of the diode is also connected to a further open end stub 38 at one-quarter of the wave length of twice the local oscillator frequency and to another stub 40 at one-quarter the wave length of the output frequency. These stubs 38 and 40 effectively produce a radio frequency sink or ground for the indicated frequency signals. The anode of diode 36 is connected to two grounded stubs 42 and 44 which are again connected to ground 30 and this anode of diode 36 is also connected to one input of a microstrip microwave rat-race hybrid ring generally designated as 46. The junction 12, near the input, is also connected through an RF rejection filter 48, past an open stub 50 similar to that of 34, and to a cathode of a diode 52. This cathode is also connected to stubs 54 and 56 corresponding respectively to 38 and 40. The anode of diode 52 is connected to a further input of rat-race ring 46 and is connected to a sink or ground through stubs 58 and 60. A local oscillator input 62 supplies a high level carrier signal to the rat-race ring 46 and an output of the mixer is obtained from the ring at output 64. Also illustrated on the ring 46 is a block of low dielectric constant dielectric 66 which moves about a pivot point 68 and has a field distortion means in the shape of a metal or other field distorting screw 70. It should be discernable to those knowledgeable in the art that screw 70 creates a perturbation of the electric field that terminates on the microstrip conductor and may therefore be metal or dielectric. This field distortion means may be adjusted vertically over the main portion of the ring 46 and can be adjusted on pivot point 68 to various positions on the circumference of this ring. While screw 70 is shown vertically adjustable it may also be adjustable from other directions if so desired.

Figure 2:
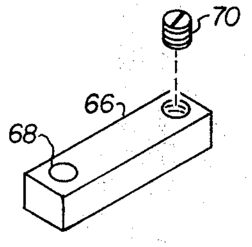
FIG. 2 is a detailed drawing of the carrier null adjustment device of FIG. 1.

In FIG. 2 more detail is shown in an isometric view of the dielectric 66 with its pivot point 68 and the field distorting means or screw 70 which is inserted in the dielectric 66.

Figure 3:
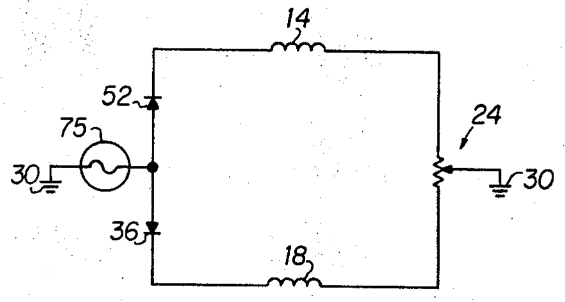
FIG. 3 is a schematic diagram of the carrier null potentiometer portion of FIG. 1.

A circuit diagram in FIG. 3 illustrates the same designations as used in FIG. 1. A signal generator 75 would correspond to the local oscillator frequency of FIG. 1 except that in FIG. 1 it is divided by the rat-race ring into two outputs which are of opposite phases as applied to the diodes 36 and 52.

Figure 4:
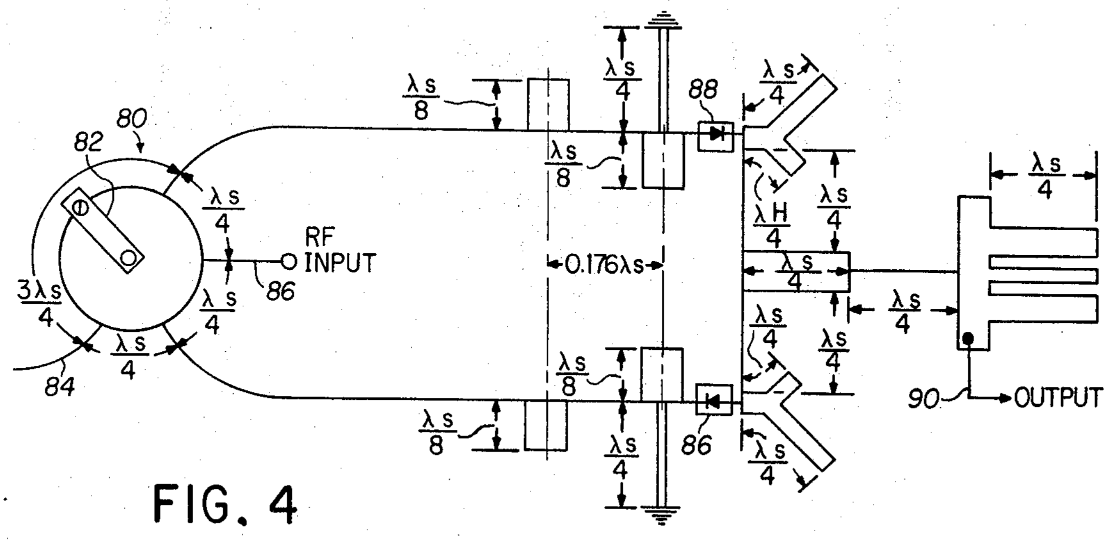
FIG. 4 is a block schematic diagram of a downconverter utilizing the carrrier null adjust portion of the present invention.

FIG. 4 illustrates a rat-race ring generally designated as 80 having an adjustable means for use as a carrier null adjust 82, a local oscillator input 84 and an RF input 86. The local oscillator and RF inputs are combined in the ring 80 and applied to two diodes 86 and 88 and mixed before the resultant signals appear at the balanced output 90 of this device. As will be apparent, there are various filters appearing between the ring 80 and the output 90. More detail on the operation of a downconverter as compared to an upconverter may be ascertained from U.S. Pat. No. 3,659,206 issued Apr. 25, 1972, and assigned to the same assignee as the present invention.

OPERATION

In operation, an intermediate frequency signal is applied at input 10 and converted to two opposite phase signals via the transformer 16. The outputs of these transformers are supplied to the two diodes 36 and 52. The local oscillator or pump carrier input signal is applied at lead 62 to the rat-race ring 46 and through the dividing action of the rat-race ring as is well known in the art and as further explained in the referenced patent will divide into two opposite phase signals and be applied to the anodes of the two diodes 36 and 52. Ideally, the two local oscillator signals appearing at the anodes of the diodes 36 and 52 should be equal in amplitude and 180° out-of-phase. This should provide complete cancellation of the pump or local oscillator carrier in the output line. In practice, however, the mixer diode 36 and 52 are not ideal in their characteristics and therefore the magnitude and phase of the transmitted local oscillator signals may be shifted from their ideal values. This means that the magnitude of the two opposite phase local oscillator signals applied to the diode and rectified thereby may not be equal and even if they were exactly 180° out-of-phase there would not be a complete cancellation of this frequency signal. Likewise, these two out-of-phase local oscillator signals could be equal in magnitude, but because of more phase shift in one of the legs as compared to the other the carriers would not be 180° out-of-phase in the output line and therefore again there would not be a complete or balanced cancellation as is desired in the balanced upconverter or mixer configuration. The carrier null potentiometer 24 will provide some compensation for this unbalance. Movement of the wiper of this potentiometer will decrease the current in one of the diodes 36 and 52 while increasing it in the other. When the current in a mixer diode is changed, the junction resistance and also the junction capacitance of the diode will be changed. A variation of this current, therefore, produces both a change in magnitude and phase of the local oscillator frequency signal as it is transmitted from the mixer diodes 36 and 52 back to the ring and to the output 64. While the null potentiometer 24 does improve the performance of the mixer, it can only compensate for some of the variations in the diodes themselves. No compensation can be made for variations from unit-to-unit in the manufacturing tolerances of the rat-race ring and its connections. As is well known, if the connections of the terminals 62 and 64 and the connections to the anodes of the diodes to the rat-race ring are not kept at exact fractional wavelengths and the diodes are not electrically identical, the outputs will not be 180° out-of-phase from the local oscillator input and they will not cancel when returned to the output 64.

In view of the above, an additional device was placed in the rat-race ring comprising a field distortion means in the form of a screw 70 as held in place by dielectric 66 and rotated on its pivot point 68. The screw 70 is centrally located over the ring area. The effect of the screw 70 is to cause reflections in the local oscillator signal as it appears on the hybrid ring. These reflections will be both between the source of the local oscillator signal 62 and the screw 70 and also between the screw 70 and the returning signals from the diodes after the mixing action occurs in the diodes. The nearness of the screw to the ring will vary the magnitude of the reflected signal and the adjustment of the dielectric 66 on its pivot point 68 will reposition screw 70 on the circumference of the ring to vary the phase of the reflected signal.

It should be noted that in many instances more than one position may be found on the hybrid ring which will cause substantially the same nulling action of the local oscillator frequency as measured at the output 64. In some instances where more than two such positions can be found for particular frequencies of operation, there will only be one or two positions which will operate satisfactorily over a wide range of local oscillator and intermediate frequency signal frequencies.

The operation of FIG. 4 is believed obvious from the above description of FIG. 1, but will be summarized very briefly. A local oscillator input is applied on 84 while a radio frequency received signal is applied on lead 86. These are combined in the hybrid ring 80 and mixed in the diodes 86 and 88 before any resultant signals appear at the output 90. Again, the device 82 is adjusted on the circumference and the field distortion means therein is adjusted in nearness to the ring to vary the reflections of the local oscillator (l.o.) signal appearing on 84 and thus minimize the l.o. signal in the output.

While two circuits have been shown, an upconverter or modulator of FIG. 1 and a downconverter or demodulator of FIG. 4, the inventive concept lies in the idea of providing additional nulling of the signal over and above that accomplished by using a balanced mixer circuit. This balancing takes the form of a field distortion means in both types of mixers and in the case of an upconverter takes the form of additional means to differentially vary the currents in the mixing diodes.

Since other variations of the field distortion means may be apparent to those skilled in the art, I wish to be limited not by the particular embodiments illustrated but by the scope of the appended claims, wherein I claim:

1. The method of modulation transfer by mixing a microwave pump carrier signal with an intermediate frequency carrier in a pair of mixing diodes while simultaneously suppressing the pump carrier at an output containing information signals modulated on a sideband frequency comprising the steps of:

supplying a power radio frequency carrier through a rat-race hybrid ring and through two diodes to radio frequency ground whereby the diodes receive the carrier at substantially opposite phases;

supplying information carrying intermediate frequency signals from an intermediate frequency source through said two diodes to a sink;

adjusting the direct current flow in said diodes in opposite directions for altering the effective diode impedances as seen by the radio frequency carrier and thereby altering the phase of reflected signals; and adjusting the phase and amplitude of radio frequency first sideband signals by juxtaposing a capacitive device with said ring at a variable distance therefrom and variable in position thereon.

2. In a microwave balanced mixer circuit including a "rat-race" hybrid ring feeding substantially opposite phases of a local oscillator frequency carrier to a pair of mixer diode means and the diodes being also fed by an information carrying input signal an inventive addition, comprising in combination:

means for adjusting the amplitude of current flow in said pair of diode means in opposite directions one with respect to the other; and adjustable means juxtaposed said hybrid ring for altering the phase and amplitude of reflected signals to minimize extraneous frequency output signals.

3. In a microstrip microwave rat-race hybrid circuit ring including leads for use in mixing two input signals and outputting resultant signals an improvement comprising, in combination:

field distortion means juxtaposed said ring and adjustable in nearness to said ring and adjustable in position on the circumference of said ring for adjusting the phase and amplitude of reflected signals to minimize the amplitude of reflected signals to minimize the amplitude of one input signal as it appears at an output lead of said circuit ring.

4. Microwave mixer apparatus comprising, in combination:

rat-race hybrid circuit ring means having first, second, third, and fourth terminal means attached thereto;

first and second non-linear mixer means connected respectively to said first and second terminal means of said hybrid circuit means;

microwave filter means connected to each of said first and second mixer means;

potentiometer means including first and second ends and slider means;

reference potential means;

means connecting said slider means to said reference potential means;

fifth terminal means including means for connecting said first and second ends, respectively, of said potentiometer means to said first and second mixer means;

first signal supplying means for supplying a first signal of a first frequency to be mixed connected to said third terminal means of said circuit means;

second signal supplying means for supplying a second signal of a second frequency to be mixed connected to one of said fourth and fifth terminal means;

apparatus output means for supplying a resultant mixed signal of a third frequency connected to the other one of said fourth and fifth terminal means; and null adjustment means adjustably juxtaposed said ring means for minimizing the amplitude of signals of one of said first and second frequencies appearing at said apparatus output means.

5. The method of reducing the amplitude of local oscillator frequency output signals from a rat-race hybrid ring of a microwave mixer circuit using mixer diodes comprising the single step of:

adjustably juxtaposing the distance of a field distortion means on the circumference of the ring whereby a portion of the local oscillator signal is reflected to compensate for at least one of: a) the operating characteristic differences of the mixer diodes, and b) imperfect hybrid balance.

6. A microwave balanced mixer circuit including at least two mixing diodes and a microstrip rat-race hybrid ring having a local oscillator signal input means, an information bearing signal input means and a mixer output means, operating characteristic differences of the mixing diodes and imperfections in the rat-race ring generating components of the local oscillator signal in the mixer output and the inventive addition comprising:

field distortion means adjustably juxtaposed said ring in nearness and circumferential position for adjusting the phase and amplitude of signals reflected thereby to minimize the amplitude of local oscillator frequency derived signals at said mixer output means.

* * * * *